United States Patent [19]

Goodman et al.

[11] 3,892,891

[45] July 1, 1975

[54] PROVISION OF REPRODUCIBLE THIN LAYERS OF SILICON DIOXIDE

[75] Inventors: Alvin Malcolm Goodman, Princeton, N.J.; James Miklos Breece, Morrisville, Pa.

[73] Assignee: RCA Corporation, New York, N.Y.

[22] Filed: May 15, 1972

[21] Appl. No.: 253,416

Related U.S. Application Data

[63] Continuation of Ser. No. 51,248, June 30, 1970, abandoned.

[52] U.S. Cl. .................. 427/255; 29/527.2; 156/17; 427/314

[51] Int. Cl. ............................................ C23c 11/08

[58] Field of Search ............ 117/201, 106 A, 106 R, 117/118, 213, 62, 54, 8, 6; 317/235 AG, 235 AP; 156/17; 29/580, 527

[56] References Cited

UNITED STATES PATENTS 3,426,422 2/1969 Deal .................................... 117/213

3,647,535 3/1972 Naber .................................. 117/106

OTHER PUBLICATIONS

E. Kool; The Surface Properties of Oxidized Silicon, Springer–verlag, N.Y., Inc., New York, 1967, pp. 14, 34–35, 67.

*Primary Examiner*—Charles E. Van Horn
*Assistant Examiner*—Jerome Massie
*Attorney, Agent, or Firm*—G. Bruestle; M. Epstein; H. Christoffersen

[57] ABSTRACT

Conventionally cleaned silicon wafers are provided with a thermally grown layer of silicon dioxide which is thereafter removed to provide a reproducibly clean wafer surface. The wafer is then preheated at a moderate temperature, in the order of 150°C., in a controlled environment to provide reproducibly uniform conditions of temperature and wetness. A silicon dioxide layer of controlled and reproducible thickness is thereafter thermally grown on the silicon wafer.

6 Claims, 2 Drawing Figures

INVENTORS
Alvin M. Goodman
James M. Breece.
BY M. Y. Epstein
ATTORNEY

INVENTORS
Alvin M. Goodman and
James M. Breece.
BY M. Y. Epstein
ATTORNEY

PROVISION OF REPRODUCIBLE THIN LAYERS OF SILICON DIOXIDE

This is a continuation of application Ser. No. 51,248, filed June 30, 1970, now abandoned.

BACKGROUND OF THE INVENTION

This invention relates to semiconductor devices, and particularly to a method of accurately and reproducibly providing thin films of silicon dioxide on a surface of a body of silicon.

Certain types of recently developed semiconductor devices, e.g., semiconductor memory devices, utilize a thin film of silicon dioxide on a body of silicon. In one such device, the design calls for a silicon dioxide film having a thickness of 20 A with a tolerance of plus or minus 1 A.

Using known techniques, films of the desired thickness can be grown. A major problem heretofore, however, is that it has not been known how to provide such thin films on a routine and high yield basis, the processes heretofore used requiring individual measurement and selection of the devices on a device to device basis. Thus, the fabrication of devices using such films has been a tedious and expensive process providing a low yield of devices.

For example, in a report entitled, *Investigation of New Concepts of Adaptive Devices*, by H. A. R. Wegener, Interim Scientific Report, Contract No. NAS 12-570, September, 1968, it NAS reported, beginning at Page 89, that five different approaches were taken to form the silicon dioxide films but that a major disadvantage "was the fact that oxide thicknesses in the range from 10 A to 100 A were hard to control," and that (page 95), "a tighter control must be achieved." While this report is dated September, 1968, to applicant's knowledge, to date, no substantial improvements have been developed in techniques for providing thin films of silicon dioxide on a routine and reproducible basis.

DESCRIPTION OF PREFERRED EMBODIMENTS OF THE INVENTION

Figure 1:
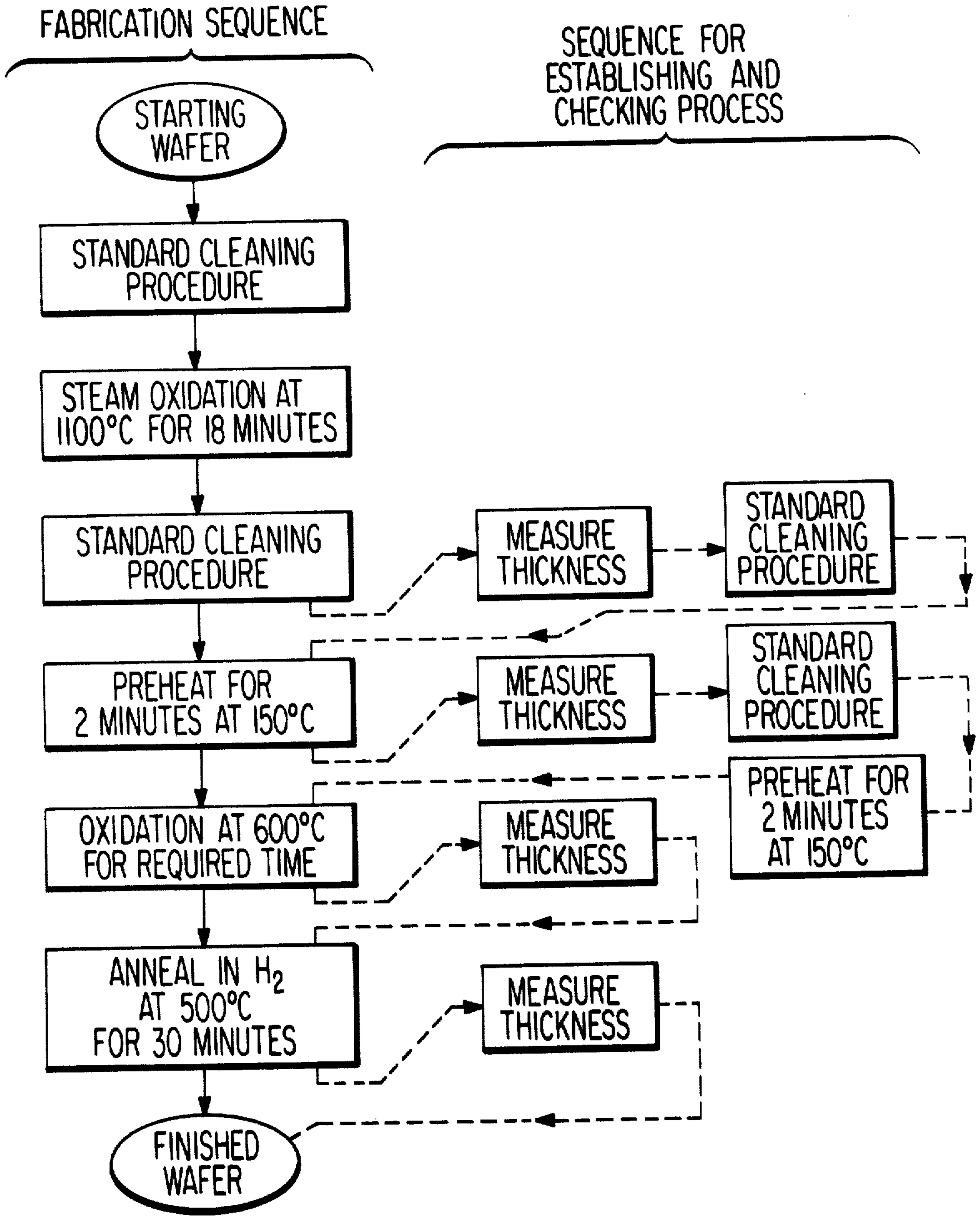
FIG. 1 is a flow chart showing the successive steps in the formation of an accurately controlled layer of silicon dioxide on a body of silicon, and steps for monitoring the process.

From an examination of the literature, for example, the aforementioned Interim Scientific Report, at Page 93 thereof, it would appear that a major problem of the prior art techniques of providing reproducible thin films of silicon dioxide is that of controlling the thickness of the "spontaneous" oxide layer, i.e., that layer of silicon dioxide which forms when a surface of silicon is exposed to oxygen. As reported (see, *Ellipsometry*, by R. J. Archer, Goertner Scientific Co. (1968), Page 25), such spontaneous layers generally have a thickness in the order of 16 A, with an unpredictable variation therefrom in the order of plus or minus 5 A. Thus, regardless of the techniques used to provide the final thickness of silicon dioxide, a major problem in the past has been that of controlling the thickness of the spontaneous oxide layer.

Reproducible control of the spontaneous silicon dioxide layer is provided, in accordance with the instant invention, as follows. The process begins, see, also, the flow chart of FIG. 1, with a silicon wafer of known type and shape, e.g., a disc, which has been prepared and cleaned by known techniques. For example, the wafer, which is cut from an ingot and polished, as known, is first boiled for 5 minutes in a cleaning solution for four volume parts $H_2O$, one volume part $H_2O_2$ (solution 30%-stabilized), and one volume part $NH_4OH$. Thereafter, the wafer is triple rinsed with distilled water and then etched in concentrated hydrofluoric acid at room temperature for 2 minutes. After the etching step, the wafer is rinsed by adding triple distilled water to the etching bath to dilute the hydrofluoric acid, pouring off part of the bath, and further diluting and pouring off at least five times, the wafer not being exposed to air until after the final dilution and rinse. This rinsing procedure is useful for avoiding the generation of stain films on the silicon surface. Finally, the wafer is spun dry for 1 minute in a wafer spinner of known type.

Other standard cleaning procedures can be used.

Thereafter, a relatively thick first layer of silicon dioxide, substantially thicker than the desired final silicon dioxide layer, is thermally grown on the silicon wafer. By "thermally grown" is meant a technique by which oxygen is caused to react with the silicon of the wafer at an elevated temperature to form a layer of silicon dioxide on the wafer. For example, water vapor can be passed over the wafer which is heated to a temperature in the order of 1,100°C. Thermal growth techniques are known.

The required thickness or depth of the thermally grown first layer is not critical, and is dependent, to some extent, upon the procedure used to polish or clean the wafer. That is, the various known wafer polishing and cleaning processes tend to provide an undesired wafer surface condition which can consist of, for example, some sort of damage to a surface layer of the wafer, or the presence of a film of some material, not presently identified, which is extremely difficult to remove. In either event, the presence of this undesired surface condition interferes with the subsequent processing of the wafer.

The extent or depth of this undesired surface condition varies depending upon the polishing or cleaning process used and the previous history of the sample. It is intended, in accordance with the instant invention, that the thermally grown first oxide layer, which is subsequently removed, as explained hereinafter, has a thickness to include at least a substantial portion of the surface layer of the wafer which has been adversely conditioned. Thus, upon removal of the first layer, most or all of the adversely conditioned surface layer of the wafer is removed therewith, providing a substantially virgin surface of the silicon wafer.

In one series of tests, for example, in which the above-described cleaning procedure was used, the wafers were thermally oxidized to a depth in the order of 3,000 A. Since, in general, the thermal oxidation of the wafer to a depth in excess of what is minimally required to achieve the desired end results gives rise to no problems, a satisfactory thickness of the oxide first layer can be readily determined.

In another embodiment, for example, in which the undesired surface condition comprises a chemically formed stain, e.g., resulting from the etching of the wafer in hydrofluoric acid and simultaneous exposure of the wafer to water and oxygen, the film is removed using a first layer of silicon dioxide having a thickness as little as between 100–200 A.

The oxide first layer is thereafter removed. Various cleaning procedures, such as the previously described cleaning procedure used prior to the formation of the silicon dioxide first layer, can be used. Important in the first layer removal process, however, is that the wafer surface is not inadvertently exposed to the air in order to prevent premature formation of a spontaneous oxide layer.

It is found, in accordance with the instant invention, that upon the conclusion of the oxide layer removal process, i.e., upon the first exposure of the wafer to the air, the spontaneous layer of silicon dioxide that forms on the wafer forms at a highly uniform and predictable rate. Thus, for example, under normal room conditions, within one minute after the end of the oxide layer removal step, the spontaneous layer has a thickness of between 5 and 7 A, and between 6 and 9 A after between 2 and 3 minutes. Variations in room conditions of temperature and humidity do affect the rate of growth of the spontaneous layer, but, it is found, to a relatively small extent.

Thereafter, the thickness of the spontaneous layer is increased to the desired thickness using a thermal growth technique. For clarity of description, the oxide layer which is formed by increasing the thickness of the spontaneous layer is referred to hereinafter as the "final" layer.

It is found, in accordance with the instant invention, that although the rate of growth of the spontaneous layer is little affected by variations in the environment to which the wafer is exposed, these same variations give rise to significant variations in the rate of growth of the final layer when the wafer is heated at elevated temperatures in the thermal oxide growth processes. A reason for this, it is believed, is that upon initial heating of the wafer to the elevated temperature, the rate of growth of the oxide is relatively rapid. Thus, variations in either the temperature or wetness of the various wafers which are being processed, caused by variations in the cleaning procedure and/or the air to which the wafers are exposed, cause variations in the rate of initial heating and oxidation of the wafers, whereby significantly large variations in the amount of oxide growth can occur.

To eliminate the effects of these variations, the wafers are pre-heated at a moderate temperature, e.g. in the range between 100 and 200°C., in a controlled atmosphere, e.g., air having a controlled dew point. The wafers are heated long enough to cause each of the wafers, regardless of the slight variations of temperature and wetness thereof existing at the beginning of the process, to attain uniform conditions of temperature and wetness. For example, the wafers are pre-heated for 2 minutes at a temperature of 150°C.

While the pre-heating does cause some growth of the final layer, the "moderate" temperature used in the pre-heating steps is sufficiently low that the rate of growth of the final layer is relatively slow and relatively unaffected by the pre-existing variations in the conditions of the wafers. Thus, the pre-heating step does not introduce variations in the thickness of the final oxide layers. For example, at the conclusion of the pre-heating step, the final oxide layer thickness is in the range between 9 and 11 A when measured within 2–3 minutes.

Because the thickness of the spontaneous oxide layer increases with time, the pre-heating step is preferably begun within a pre-set time, e.g., within 2 minutes, after the wafers have been first exposed to the air after the first oxide layer removal process. This insures that the thickness of the spontaneous layers on the wafers is uniform at the start of the pre-heating step.

Apparatus for performing the above-described heating step can comprise, for example, various ones of known multiple zone oxide furnaces. To provide a reproducible level of humidity within the furnace, the interior thereof is connected to a source of water at a specific highly controlled temperature or, alternatively, to pure oxygen for zero humidity. For example, water vapor can be generated in a quartz flask maintained at 101°C. The flask is connected to the furnace by quartz tubing which is heated to prevent condensation of water on the inner surface of the tubing. Further, it is convenient to pre-heat the wafers in a low temperature region of the same furnace in which the final oxide layer is grown to its desired thickness, as described hereinafter. Thus, the wafers do not leave the controlled atmosphere until after the growth of the final oxide layer is completed, thereby providing further control over the process.

After the pre-heating step, the final oxide layer is increased to the desired thickness using known thermal growth techniques. For example, the wafer is heated in water vapor in a known type of oxidation furnace at a temperature of 600°C.

Figure 2:
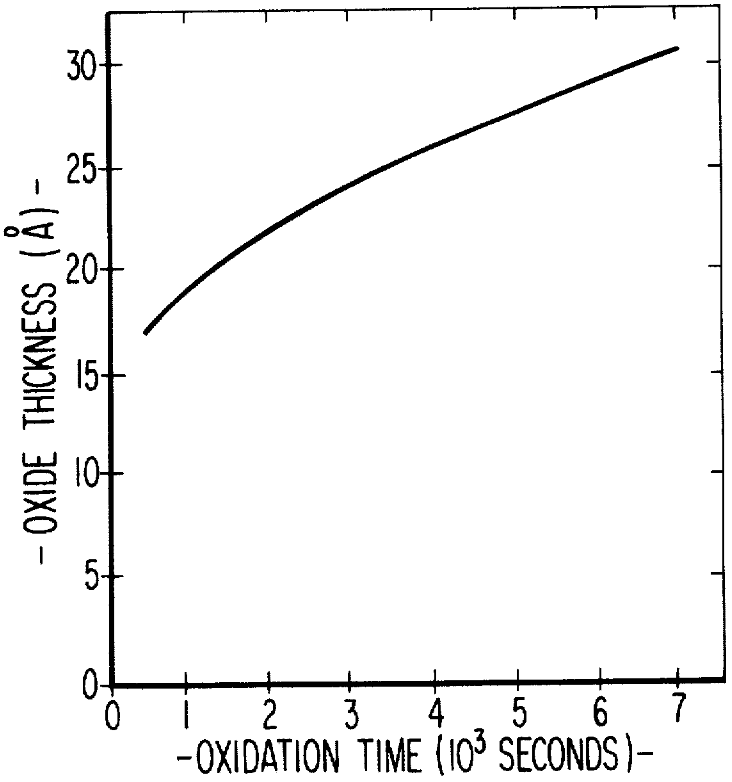
FIG. 2 is a graph showing the thickness of the silicon dioxide layer produced versus time of the growth process.

A curve showing the thickness of the silicon dioxide final layer with duration of the thermal growth process, under the above-described conditions, is provided in FIG. 2. The desired thickness of the final oxide layer is obtained by removing the wafer from the furnace after a time corresponding to the oxide layer thickness desired. Experience has revealed that, using the hereindescribed process, the thickness of the silicon dioxide final layer from wafer to wafer is reproducible within a tolerance of plus or minus 1 A.

The use of other thermal growth processing temperatures results in different growth curves, the results, however, still being equally reproducible. Excessively high temperatures, e.g., in excess of 800°C., cause such a rapid growth rate as to interfere with the control of the process. Excessively low temperatures, e.g., below 500°C., substantially increase the processing time required.

In certain types of devices utilizing thin silicon dioxide films, it is desirable, for obtaining improved device performance, to further process the wafers by an annealing process, e.g., heating the wafers to a temperature of 500°C. in a hydrogen atmosphere for a period of 30 minutes. The purpose of such annealing is to reduce the effective surface state density at the interface between the silicon dioxide layer and the silicon wafer.

It is found that additional growth of the final oxide layer during the annealing process can be substantially avoided, thereby avoiding the introduction of another variable in the final layer fabrication process, by using hydrogen of a high degree of purity. For example, the highest purity commercially available hydrogen is further purified by passing it through a suitable purifier, such as the model D "DEOXO" purifier, sold by the Engelhard Corp., Industrial Equipment Division, and then through a coil submerged in liquid nitrogen.

At the completion of the above-described procedures, the silicon wafer, having a layer of silicon dioxide of predetermined thickness thereon, is further processed to provide the desired semiconductor device. Examples of such devices and methods of fabrication thereof are known, and hence not described herein. It is noted, however, that at the termination of the herein-described processes, additional growth of the final oxide layer will occur if the wafer is exposed to air. Thus, after provision of the final layer to the desired thickness, the wafer is preferably either stored in a non-oxidizing atmosphere or immediately further processed to provide a protective layer, e.g., a layer of silicon nitride, covering the final oxide layer.

Included in the flow chart shown in FIG. 1 is a procedure which can be followed in the initial set-up of the hereindescribed process and/or in the periodic checking of the process.

Thus, after the step of removing the first relatively thick oxide layer using a standard cleaning procedure, the thickness of the spontaneous oxide layer is measured. The measurements can be made using standard ellipsometry techniques, such as those described in the previously cited publication by Archer.

As previously noted, the thickness of the spontaneous oxide layer should be between 6 and 9 A after between 2 and 3 minutes of the first exposure of the wafer to the atmosphere. This thickness of the spontaneous layer is somewhat thinner than that reported in the literature (i.e., around 16 A), and is indicative, we have found, that the prior steps were performed properly and that a really clean surface of silicon has been provided. That is, the thinness of the spontaneous layer indicates that the first thermal oxide layer was sufficiently thick to remove substantially all of the undesired surface film on the wafer.

After this first thickness measurement, if the test wafer is to be introduced back into the process, as indicated in the flow diagram, the wafer must be first cleaned of the extra thick spontaneous layer which formed during the thickness measuring process. This is done, for example, using the same cleaning procedure used to remove the first oxide layer. Then, within the pre-set time from the conclusion of the cleaning process, the wafer is subjected to the pre-heating process.

Similarly, after the second thickness measurement, used to check the results of the pre-heating process, the test wafer is stripped of the extra thick oxide layer arising as a result of the measuring step, and then resubjected to the pre-heating step to provide an oxide layer of thickness normally obtained after this step before the wafer is sent on to the next step.

We claim:

1. A method of reproducibly providing, in separately performed procedures, a thin layer of silicon dioxide of a preselected thickness less than in the order of 100 A on silicon bodies, comprising:

cleaning a surface of each of said bodies, thermally growing on said surfaces a first layer of silicon dioxide having a thickness greater than said preselected thickness, removing said first layer without exposure of said surfaces to an oxidizing atmosphere to provide a similarly clean surface on all of said bodies, after the conclusion of said removing step and at the same pre-set time within 3 minutes of any exposure of said bodies to an oxidizing atmosphere provided by normal room conditions, preheating said bodies at a temperature between 100° and 200°C in a substantially identical atmosphere of preselected dew point for a period of time sufficient to provide substantially identical conditions of temperature and wetness of the surfaces of said bodies from procedure to procedure, and thereafter, thermally oxidizing said surfaces at a temperature substantially greater than that used in said pre-heating step to provide a silicon dioxide layer thereon of said pre-selected thickness.

2. A method as in claim 1 including the further step of annealing said bodies in highly purified hydrogen.

3. A method as in claim 1 wherein each of said bodies is maintained in the same oxidizing atmosphere during and between said pre-heating and thermally oxidizing steps, and each of said bodies is maintained at a constant temperature during said pre-heating step.

4. A method of reproducibly providing, in separately performed procedures, a thin layer of silicon dioxide of a preselected thickness less than in the order of 100 A on silicon bodies comprising:

cleaning a surface of each of said bodies, thermally growing on said surfaces a first layer of silicon dioxide having a thickness greater than 100 A, removing said first layer without exposure of said surfaces to an oxidizing atmosphere to provide a similarly clean surface on all of said bodies, exposing said bodies to an oxidizing atmosphere provided by normal room conditions for the same preset time not in excess of two minutes allowing the formation of a spontaneous layer of silicon dioxide on said surfaces but of a thickness not exceeding a preselected amount substantially less than said preselected thickness, pre-heating said bodies at a temperature in the range between 100° and 200°C in a substantially identical atmosphere of preselected dew point for a limited time sufficient to provide substantially identical conditions of temperature and wetness of said surfaces while restricting the increase of the thickness of said spontaneous layer to a preselected rate, and thereafter, thermally oxidizing said surfaces at a temperature substantially greater than said pre-heating temperature to further increase, at a rate greater than that of said pre-heating step, the thickness of said silicon dioxide layer to said preselected thickness.

5. The method of claim 4 wherein each of said bodies is maintained in the same oxidizing atmosphere during and between said pre-heating and thermally oxidizing steps.

6. The method of claim 5 wherein the duration of said pre-heating step is limited to prevent the thickness of said spontaneous layer from increasing to more than 11 A.

* * * * *